United States Patent
Zhang et al.

(10) Patent No.: US 10,380,968 B2
(45) Date of Patent: Aug. 13, 2019

(54) METHOD FOR ADJUSTING THE ADAPTIVE SCREEN-REFRESH RATE AND DEVICE THEREOF

(71) Applicant: MediaTek Singapore Pte. Ltd., Singapore (SG)

(72) Inventors: Xuecheng Zhang, Beijing (CN); Xiang Xu, Beijing (CN); Chin-Wen Liang, Hsinchu (TW); Meng-Hsun Wen, Zhudong Township, Hsinchu County (TW); Huan-Pu Kan, New Taipei (TW); Cheng-Pin Huang, Kaohsiung (TW)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 15/844,930

(22) Filed: Dec. 18, 2017

(65) Prior Publication Data

US 2018/0174550 A1 Jun. 21, 2018

(30) Foreign Application Priority Data

Dec. 19, 2016 (CN) .......................... 2016 1 1175417
Oct. 10, 2017 (CN) .......................... 2017 1 0936541

(51) Int. Cl.
*G09G 5/12* (2006.01)
*G09G 5/00* (2006.01)
*G06F 1/3234* (2019.01)

(52) U.S. Cl.
CPC ........... *G09G 5/005* (2013.01); *G06F 1/3265* (2013.01); *G09G 5/003* (2013.01); *G09G 5/12* (2013.01); *G09G 2320/02* (2013.01); *G09G 2330/021* (2013.01); *G09G 2340/0435* (2013.01)

(58) Field of Classification Search
CPC .............. G06F 1/3265; G09G 2320/02; G09G 2330/021; G09G 5/005
USPC ................................ 345/7–8, 102, 214, 698
See application file for complete search history.

(56) References Cited

U.S. PATENT DOCUMENTS

| | | | |
|---|---|---|---|
| 7,948,556 B2 * | 5/2011 | Kumakawa | G09G 5/006 348/441 |
| 9,491,398 B1 * | 11/2016 | Hou | H04N 7/0127 |
| 2008/0024467 A1 * | 1/2008 | Collins | G09G 3/2096 345/204 |
| 2008/0309652 A1 * | 12/2008 | Ostlund | G09G 5/363 345/211 |
| 2011/0080952 A1 * | 4/2011 | Vadapalli | H04N 19/107 375/240.15 |

(Continued)

FOREIGN PATENT DOCUMENTS

| | | |
|---|---|---|
| CN | 101681614 | 3/2010 |
| CN | 105185284 A | 12/2015 |

(Continued)

*Primary Examiner* — Tony O Davis
(74) *Attorney, Agent, or Firm* — McClure, Qualey & Rodack, LLP

(57) ABSTRACT

A method for adjusting the adaptive screen-refresh rate and a device thereof are provided. The method for adjusting the adaptive screen-refresh rate includes the following steps: determining a first screen-refresh rate set by the display source; and based on the first screen-refresh rate, setting a refresh rate used by a displaying module for displaying the picture or frame on a displaying screen periodically.

16 Claims, 6 Drawing Sheets

(56) References Cited

U.S. PATENT DOCUMENTS

| | | | | |
|---|---|---|---|---|
| 2012/0069030 | A1* | 3/2012 | Shang | G06F 13/14 |
| | | | | 345/520 |
| 2013/0141642 | A1* | 6/2013 | Wu | G06F 3/1407 |
| | | | | 348/441 |
| 2013/0187937 | A1* | 7/2013 | Kerofsky | G09G 3/20 |
| | | | | 345/530 |
| 2013/0257752 | A1 | 10/2013 | Tripathi et al. | |
| 2013/0335309 | A1* | 12/2013 | Kerofsky | G09G 3/3406 |
| | | | | 345/102 |
| 2014/0092150 | A1* | 4/2014 | Slavenburg | G09G 5/001 |
| | | | | 345/698 |
| 2015/0339994 | A1* | 11/2015 | Verbeure | G09G 3/2044 |
| | | | | 345/214 |
| 2015/0348509 | A1* | 12/2015 | Verbeure | H04N 9/3188 |
| | | | | 345/213 |
| 2016/0196801 | A1* | 7/2016 | Glen | G09G 5/18 |
| | | | | 345/213 |
| 2016/0277706 | A1* | 9/2016 | Tann | H04N 7/0127 |

FOREIGN PATENT DOCUMENTS

| | | |
|---|---|---|
| CN | 102968978 B | 1/2016 |
| CN | 105869560 A | 8/2016 |

\* cited by examiner

METHOD FOR ADJUSTING THE ADAPTIVE SCREEN-REFRESH RATE AND DEVICE THEREOF

CROSS REFERENCE TO RELATED APPLICATIONS

This Application claims priority of China Patent Application No. 201611175417.7, filed on Dec. 19, 2016, and China Patent Application No. 201710936541.9, filed on Oct. 10, 2017, the entirety of which are incorporated by reference herein.

BACKGROUND OF THE INVENTION

Field of the Invention

The invention generally relates to methods for adjusting an adaptive screen-refresh rate, and more particularly, to methods for adjusting an adaptive screen-refresh rate and devices thereof for balancing system power consumption and user experience in the case of insufficient screen-refresh rate provided by a display source.

Description of the Related Art

Recently, electronic devices with display functions have become more and more popular. Generally, users can use displaying modules (e.g., screens) of electronic devices to view texts, videos, etc. For example, users can use displaying modules of the electronic devices to read e-books, browse the web, watch videos, paly games and so on. The electronic device may be a device of a computing device, a portable or mobile device, a wearable device, or the like. For example, the electronic device may be one of the devices or a portion of a device of a smart phone, a smart watch, a smart bracelet, a smart necklace, a personal digital assistant or a computing device (e.g., a tablet, a laptop, a notebook, a desktop computer, a server, etc.) or part of a device. With the advancement of technology, in order to pursue the better experience of visual effect, users have been increasingly demanding on the smoothness of the videos or the game images. However, because the above-mentioned electronic devices (especially, portable electronic devices) are often equipped with batteries for power supply, it is necessary for the users to pay attention to the power consumption of the electronic devices while providing smooth images to the users.

Taking a mobile phone using Android operating system (Android) as an example, the system needs to ensure that the display device refreshes the display screen with an appropriate screen-refresh rate. A screen with a higher screen-fresh rate often consumes more power, and a screen with a lower screen-fresh rate often makes the users feel that the video they are watching is discontinuous, thereby affecting the user experience. In current Android operating system, the preset screen-fresh rate is set at 60 frames per second (FPS). That is, the screen-fresh rate set by the system for the screen is 60 Hz (which can also be expressed as 60 FPS). This is mainly due to two reasons. First, the human eye cannot feel the screen refreshing itself at 60 FPS, allowing users to enjoy the watching experience. Second, the display screen of mobile phone today is commonly developed based on the 60 FPS screen-fresh rate as the standard. The Android system may send a Vertical-Sync (V-Sync) signal at a frequency of 60 Hz (every 16.6 milliseconds) based on the principle of displaying 60 FPS.

However, in a specific mobile phone application, sometimes the screen-fresh rates provided or required by display sources are less than 60 FPS. For example, when a video is played, highly-loaded game is allowed, or the screen is not in use, the screen-fresh rate setting of the display source of the display screen can be lower than 60 Hz. Although the screen-fresh rate provided by the display source is less than 60 FPS, the system defaults to configure the displaying module still to refresh the screen at the screen-refresh rate of 60 FPS, so the system will consume additional power. Moreover, because the screen is repeatedly refreshed at a fixed screen-fresh rate, when a different display source is generated and it is not at the time of refreshing the screen, it will wait for a certain period of time to be refreshed and displayed, which may cause a display delay and greatly reduce the user experience. It is therefore a desire to have a method and a device for adjusting screen-refresh rate to balance system power consumption and user experience when the screen-refresh rate provided by the display source is less than the preset one.

BRIEF SUMMARY OF THE INVENTION

Accordingly, methods for adjusting adaptive screen-refresh rate and devices thereof are provided.

In an embodiment of the present invention, a method for adjusting an adaptive screen-refresh rate is provided. The method includes the following steps: determining a first screen-refresh rate set by a display source; and setting a screen-refresh rate used by the displaying module according to the first screen-refresh rate for displaying the picture or frame on a displaying screen periodically.

Another embodiment of the invention provides a device for adjusting adaptive screen-refresh rate. The device includes: a displaying module; and a processing module, which includes a drawing module, and the processing module is configured to determine a first screen refresh rate set by the display source according to the first screen refresh rate, and set the screen-refresh rate used by the displaying module according to the first screen refresh rate, so as to display the picture or frame on a displaying screen periodically.

The present invention provides a method for adjusting adaptive screen-refresh rate and a device thereof to balance system power consumption and user experience.

Other embodiments and advantages will be described in detail below. The above summary is not intended to define the present invention. The invention is defined by the scope of the appended claims

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The disclosure and the patent claims use certain words to refer to a particular component. It should be understood by ordinary skill in the art that, manufacturers may use different terms to refer to the same component. The disclosure and the claims are not to distinguish between the components in differences in the names, but rather in differences in the functions of the components. The terms "including" and "comprising" mentioned throughout the disclosure and the claims are intended to be open-ended terms and should be interpreted as "including but not limited to." In addition, the term "coupling" used herein includes any direct and/or indirect means of electrical coupling. The indirect means of electrical coupling include coupling through other devices.

The invention can be more fully understood by reading the subsequent detailed description and examples with references made to the accompanying drawings. The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
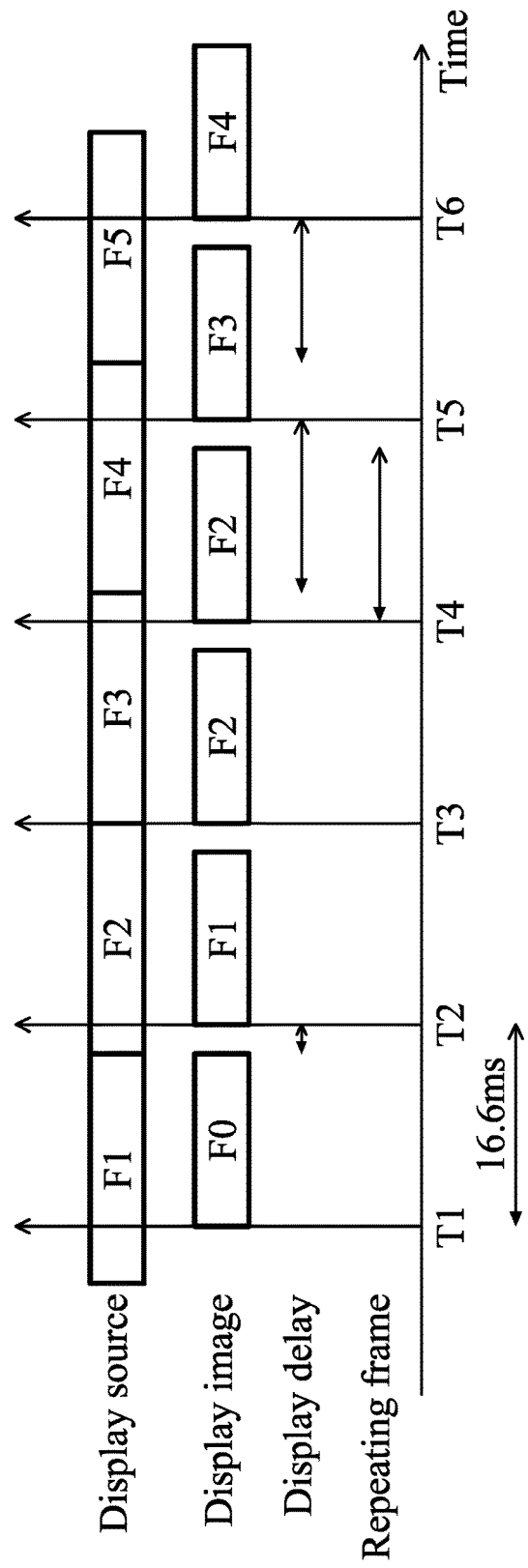
FIG. 1 is a schematic diagram illustrating a conventional display source and a screen-refresh rate according to an embodiment.

FIG. 1 is a schematic diagram illustrating a conventional display source and a screen-refresh rate according to an embodiment. As shown in FIG. 1, the system uses 60 FPS screen-refresh rate to display images, and one frame is displayed every 16.6 ms. The display source contains images F1, F2, F3, F4, and F5 with a lower screen-refresh rate. At each cycle time (e.g., T1, T2, T3, T4, T5, T6), the system refreshes the display screen based on the previous sampling of the display source (e.g., the last refresh time) to display the image, such as F0, F1, F2, F3, F4 and so on. As shown in FIG. 1, when the screen-refresh rate provided by the display source is less than 60 FPS (for example: 50 FPS), the system defaults to configure the displaying module to still refresh the screen at the screen-refresh rate of 60 FPS. This results in a mismatch between the display source and the display image. As shown in FIG. 1, because the display time of each display source is longer than the time interval indicated by 60 FPS, at the time T4, the previous sampling of the display source is still F2, so the image F2 is still being refreshed. Since the image F2 is also displayed on the display screen at the time T3, two identical images displayed at a longer time may result in the visual effect that the video displayed is slowing down, thus seriously affecting the user experience. In other words, as shown in FIG. 1, as the 60 FPS screen-refresh rate is used to display images and smaller screen-refresh rate is set for display sources, there will be a display delay. As shown in FIG. 1, a display delay occurs during the time period T1 to T2, the time period T4 to T5, and the time period T5 to T6.

It should be noted that, in the present invention, the screen-refresh rate of 60 FPS is only taken as an example, and it is not limited to 60 FPS. The screen refresh rate set by the display source and the screen refresh rate set by the system for the displaying module are all arbitrary values, for example, 20 FPS, 30 FPS, 50 FPS and 120 FPS. The above two screen-refresh rates can be the same or different.

Figure 2:
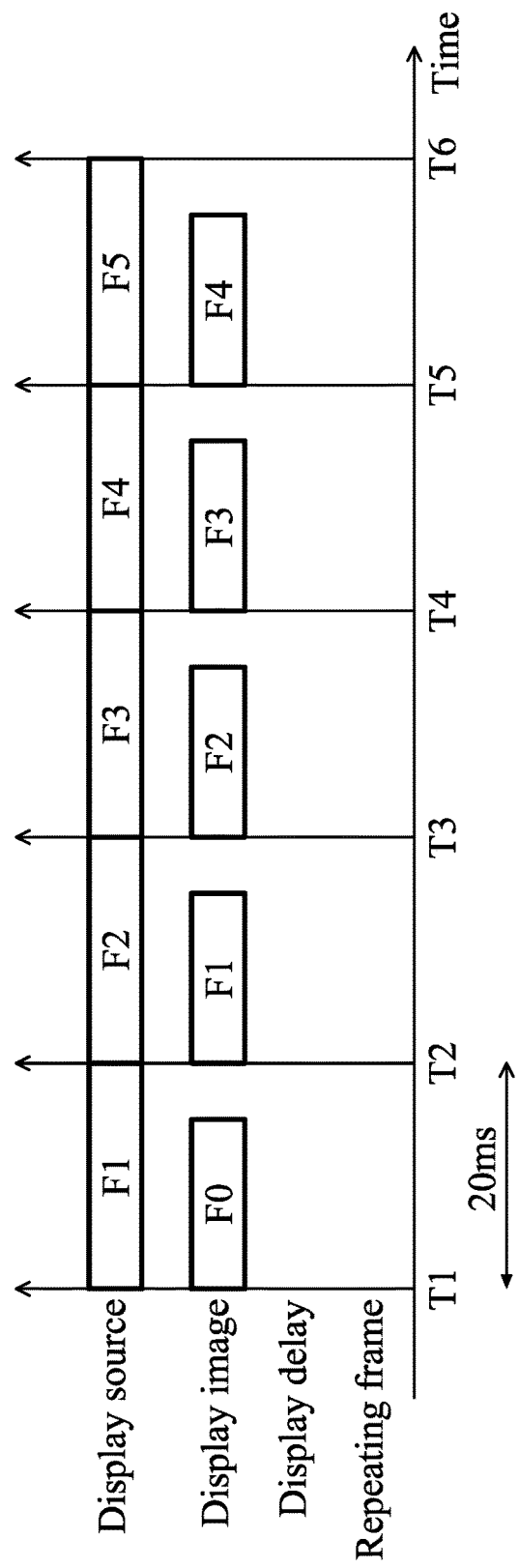
FIG. 2 is a schematic diagram illustrating a display source and screen-refresh rate according to an embodiment of the invention.

FIG. 2 is a schematic diagram illustrating a display source and screen-refresh rate according to an embodiment of the invention. In this embodiment, the electronic device uses the method for adjusting adaptive screen-refresh rate of the present invention, that is, when the preset screen-refresh rate is different from that of the display source, the screen-refresh rate set by the system for the displaying module will be adjusted to be the same as that of the display source. Specifically, as shown in FIG. 2, the system uses the screen-refresh rate (50 FPS) of the display source to display images, and the time displayed in each frame is about 20 ms. The display source contains images F1, F2, F3, F4 and F5 with a screen-refresh rate of 50 FPS. Similar to FIG. 1, at each cycle time (e.g., T1, T2, T3, T4, T5, T6), the system refreshes the display screen based on the previous sampling of the display source to display the images, such as F0, F1, F2, F3, F4 and so on. As shown in FIG. 2, the screen-refresh rate of the display source and that of the display image match, so there will be no unnecessary display delay and repetitive frame. As a result, the power consumption of the device can be reduced and the slowing-down video that affects the user experience will not appear.

Figure 3:
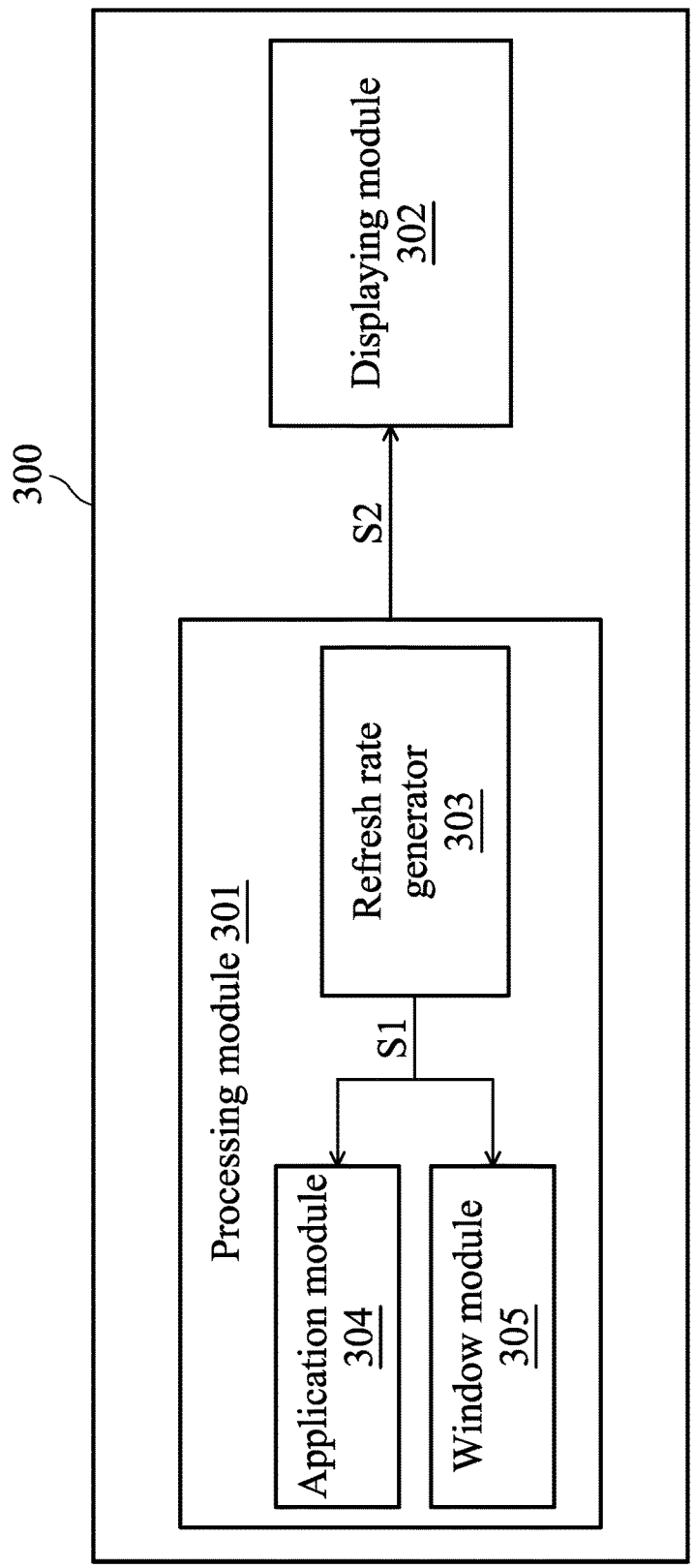
FIG. 3 is a schematic diagram illustrating an electronic device according to an embodiment of the invention.

FIG. 3 is a schematic diagram illustrating an electronic device 300 according to an embodiment of the invention. The electronic device 300 may be one of a smartphone, a smart watch, a smart bracelet, a smart necklace, a personal digital assistant (PDA) or a computing device (e.g., a tablet, a laptop, a notebook, a desktop computer, a server, etc.) or part of a device thereof. In the embodiment of the present invention, the electronic device 300 is described as an example of a smart phone with an Android operating system. The electronic device 300 includes a processing module 301 and a displaying module 302. It should be noted that the electronic device 300 may also include other components. However, for the purpose of illustrating the disclosure, other components not related to the present disclosure are omitted. The processing module 301 includes a screen-refresh rate generator 303, an application module 304, and a window module 305. The application module 304 can be a video player, game application, or the like. The screen-refresh rate generator 303 can be configured to generate a trigger signal (also referred to as V-Sync) for the screen-refresh rate of the displaying module. In the Android operating system, the window module 305 may be a Surface Finger module used for performing the corresponding operations of image processing at the front end of the displaying module. In this embodiment, the application module 304 and the window module 305 can be collectively referred to as a drawing module. In this embodiment of the present invention, based on the screen-refresh rate (referred to as the first refresh rate) set by the display source received/detected (or determined) by the processing module 301, the screen-refresh rate generator 303 sends the signal S2 to the displaying module 302, and sends the signal S1 to the application module 304 and the window module 305. The signals S1 and S2 respectively contain information related to the first screen-refresh rate, used for guiding the screen display operation. For example, the signal S1 relates to the second screen-refresh rate; and the signal S2 relates to the third refresh rate. It should be noted that, the second refresh rate related to the signal S1 and the third refresh rate related to the signal S2 may be the same or different under different application scenarios.

Figure 4:
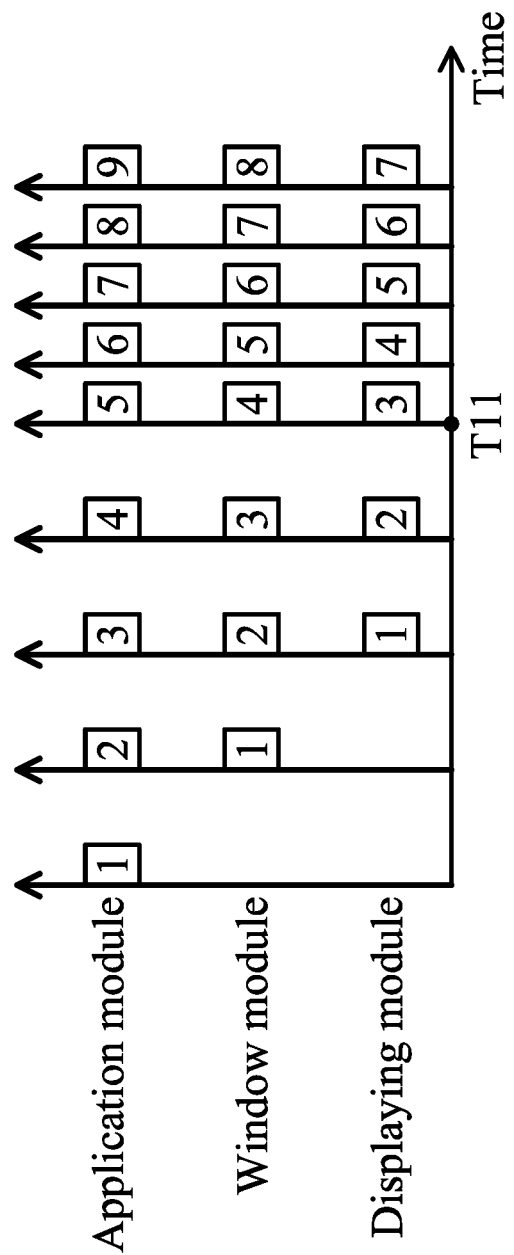
FIG. 4 is a schematic diagram illustrating the display screen in the first scenario according to an embodiment of the invention.
Figure 5:
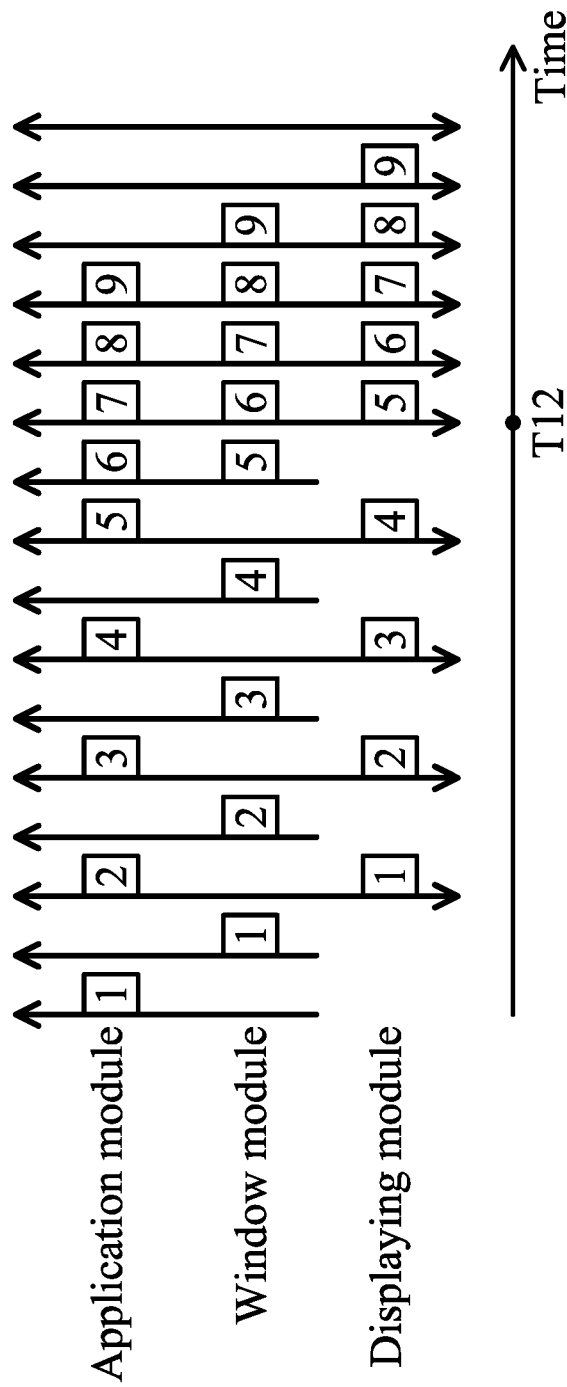
FIG. 5 is a schematic diagram illustrating the display screen in the second scenario according to an embodiment of the invention.

In the embodiment of the present invention, the displaying module 302 can perform the screen display operation directly based on the signal S2 sent by screen-refresh rate generator 303. Alternatively, the displaying module 302 may perform the screen display operation according to the signal S2 and other signals (e.g., a signal S4) obtained by the application module and the window module according to the processing of the signal S1. FIG. 4 is a schematic diagram illustrating the display screen in the first scenario according to an embodiment of the invention. FIG. 5 is a schematic diagram illustrating the display screen in the second scenario according to another embodiment of the invention.

Referring to FIG. 4 in conjunction with FIG. 3, in FIG. 4, the displaying module 302 performs the screen display according to the signal S2 and other signals (e.g., a signal S4) obtained by the application module and the window module according to the processing of the signal S1. Specifically, the application module 304, the window module 305, and the displaying module 302 can use the same screen-refresh rate, which can be the same as the screen-refresh rate set by the display source. In other words, the second refresh rate related to the signal S1 and the third refresh rate related to signal S2 are the same as the first refresh rate.

In FIG. 4, the squares with numbers 1-9 represent different screens respectively. When the application module, the window module and the displaying module use the same screen-refresh rate, even if there are two different screen-refresh rates during the displaying time (i.e., the screen-refresh rate before the time T11 is smaller than the screen-refresh rate after the time T11) as shown in FIG. 4, as the above application module, window module and displaying module always synchronize with the display source, there is no display delay and the problem of refreshing the same frame repeatedly. In addition, in order to achieve the same screen-refresh rate mentioned above, the processing module sends the same V-Sync trigger signal to the drawing module and the displaying module.

Referring to FIG. 5 in conjunction with FIG. 3, in FIG. 5, the displaying module 302 may perform the screen display operation directly according to the signal S2 sent by the screen-refresh rate generator 303. In other words, only the screen-refresh rate used by the displaying module 302 changes as the screen-refresh rate set by the display source changes. Specifically, the application module 304 and the window module 305 may use the screen-refresh rate different from that of displaying module 302 in a particular cycle. As shown in FIG. 5, the screen-refresh rate used by the application module and the window module may be a system default screen refresh rate, such as 60 FPS. If the first screen-refresh rate set by the display source is 30 FPS before the time T12 and 60 FPS after it, the displaying module may perform the display of the corresponding image (frame) according to the changed screen-refresh rate based on the signal S2 containing the information related to the first screen-refresh rate. Specifically, before the time T12, the displaying module 302 performs the screen-refresh operation according to a screen-refresh rate of 30 FPS. After the time T12, the displaying module 302 performs the screen-refresh operation according to a screen-refresh rate of 60 FPS. In order to achieve the different screen-refresh rates, the processing module may send different V-Sync trigger signals to the drawing module and the displaying module. The specific V-Sync trigger signal will be described in the following paragraph.

Figure 6:
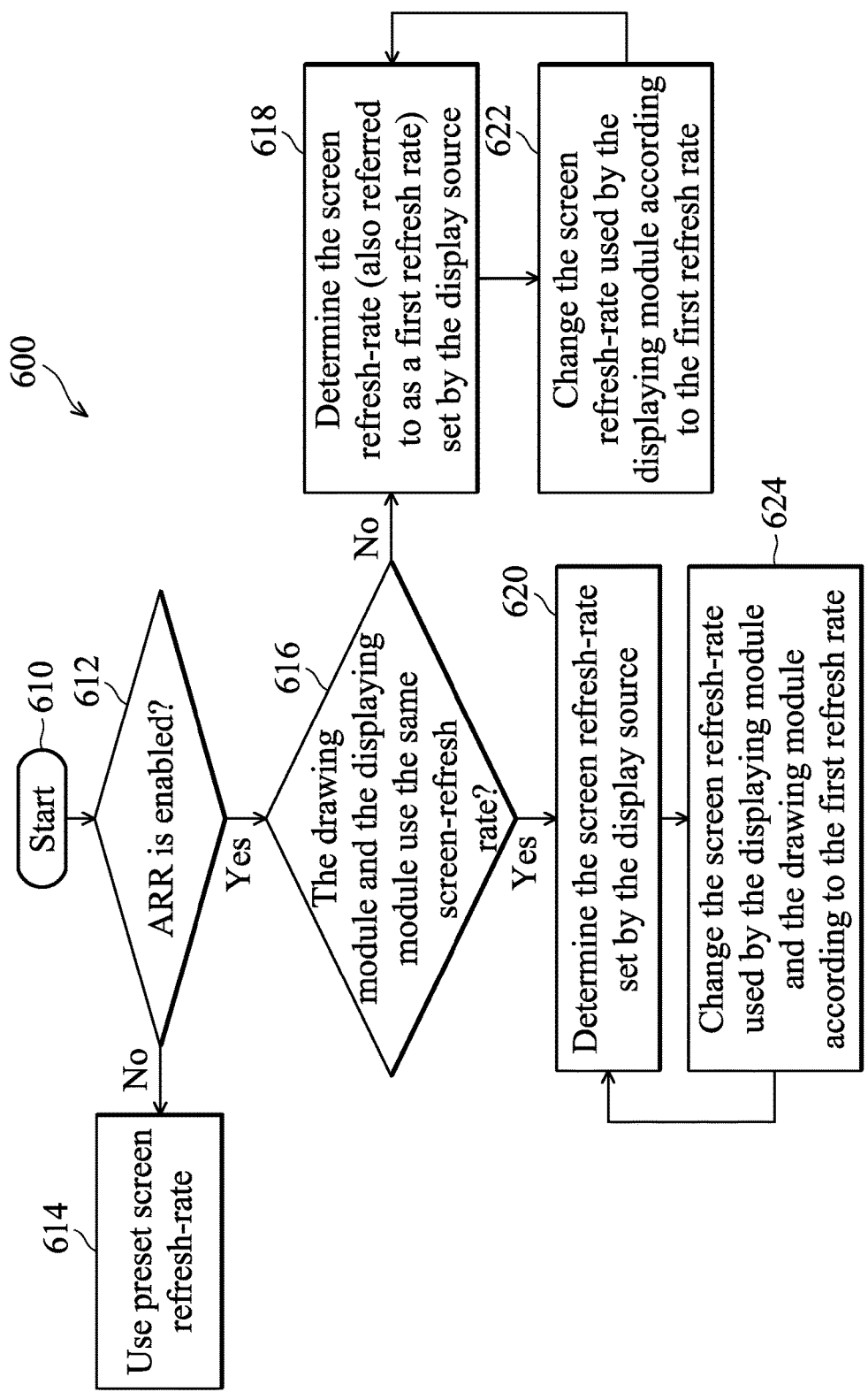
FIG. 6 is a process of a method for adjusting an adaptive screen-refresh rate according to an embodiment of the invention.

FIG. 6 is a process 600 of a method for adjusting an adaptive screen-refresh rate according to an embodiment of the invention. The process 600 may represent the content implemented by the electronic device 300. The process 600 may include a number of steps of the present invention. Although the discrete steps are used in FIG. 6, the various steps in the process 600 may be divided into additional steps, combined into fewer steps, or eliminated according to specific requirements. In addition, the steps of process 600 may be performed in the order shown in FIG. 6 or in a different order. Next, the process 600 is described with the electronic device 300 as a background, which is only for the purpose of description and the invention is not limited thereto. The process 600 begins at step 610.

In step 612, the processing module 301 of the electronic device 300 determines whether to enable an adjustment mechanism of adaptive screen-fresh rate (ARR). If the answer is no, the process 600 proceeds to step 614, otherwise, it proceeds to step 616. In step 614, the displaying module 302 uses the preset screen-refresh rate (e.g., 60 FPS preset in the system). In step 616, the processing module 301 of the electronic device 300 is configured to determine whether the drawing module and the displaying module use the same screen-refresh rate. If the answer is no, then the process 600 proceeds to step 618; otherwise, step 620 is proceeded. In step 618, the processing module 301 of the electronic device 300 determines the screen-refresh rate (which also referred to as a first refresh rate) set by the display source. The process 600 proceeds to the 622 to change the screen-refresh rate used for the displaying module for periodically refreshing the screen according to the first screen-refresh rate. The screen-refresh rate used for the displaying module can be set to be the same as the first refresh rate, or it can be set proportionally. The step 618 and the step 622 can be performed circularly over time, that is, when it is determined that the first screen-refresh rate is changed, the screen-refresh rate used by the displaying module is changed accordingly. In step 620, the processing module 301 is configured to determine the screen-refresh rate (which also referred to as the first refresh rate) used by the display source. Then, the process 600 proceeds to step 624 to change the screen-refresh rate used by the displaying module and the drawing module to periodically refreshing the screen according to the first refresh rate. The screen-refresh rate used by the displaying module and the drawing module may be set to be the same as the first refresh rate, or it can be set proportionally. The step 620 and the step 624 may be performed circularly over time over time. That is, when it is determined that the first refresh rate changes, the screen refresh rate used by the displaying module and the drawing module is changed accordingly.

In step 622, taking the Android system as an example, the V-Sync originally used by Android is split into two types of trigger signals, which are software V-Sync (SW V-Sync) and hardware V-Sync (HW V-Sync). Among them, SW V-Sync still maintains the 60 FPS screen-refresh rate originally set in Android system and HW V-Sync will be generated on condition that there is an updated signal or the lower limit of the screen is reached. In other words, if the drawing module and the displaying module are set to use the same screen-refresh rate, there is no need to split the V-Sync. If the drawing module and the displaying module are set to use different screen-refresh rates, the V-Sync will be split into two types of trigger signals, which are the SW V-Sync trigger signal (which can be referred to as the first trigger signal) used for the drawing module, and the HW V-Sync trigger signal (which can be referred to as the second trigger signal) used for the displaying module.

In summary, methods for adjusting adaptive screen-refresh rate and devices provided by the present invention can flexibly adjust the screen-refresh rate used by the displaying module to avoid repetitive frame refresh and time delay of the display screen, thus achieving the target of reducing system power consumption and improving the user experience.

As described herein, different elements may be included in other different elements or connected to other different elements. It should be understood that this structural relationship is merely an example, and in fact, other structures may also be implemented to achieve the same functions. Conceptually, any configuration of components that achieves the same functionality is effectively "associated" such that the desired functionality is achieved. Hence, any two components herein combined to achieve a particular functionality may be viewed as being "associated" each other to achieve the desired functionality, regardless of structure or intervening components. Similarly, any two elements associated in this manner may also be viewed as being "operably connected" or "operably coupled" to each other to achieve the desired functionality and, in this manner, any two elements associated with one another may also be viewed as being "operably coupleable" to one another to achieve the desired functionality. Specific examples of operably coupleable include, but not limited to, physically mateable and/or physically interactable components and/or wirelessly mateable and/or wirelessly interactable components and/or logically mateable and/or logically interactable components.

Furthermore, as to the terms in the plural and/or singular forms used herein, those skilled in the art can convert the plural to the singular and/or convert the singular to the plural depending on the context and/or the suitability of the application. For the sake of clarity, the various substitutions between singular/plural in this text are clearly defined here.

Additionally, those skilled in the art will appreciate that, in general, terms used herein, especially those used in the appended claims, as used in the body of the claims, generally have the "open" meaning. For example, the word "comprising" should be interpreted as "comprising but not limited to," the word "having" should be interpreted as "having at least," and so forth. It will be further understood by those skilled in the art that if a certain patent claim enumerates a specific numerical range and intends to include a specific numerical value, the intention is explicitly listed in the scope of the patent claim, and if not enumerated, this intent does not exist. For assistance in understanding, the appended claims may include, for example, the introductory phrases "at least one" and "one or more" to introduce the scope of the claims. However, the phrase does not intend that the recitation of the scope of the patent claims is to be construed as limiting the scope of any specific claims including an indefinite article "a" to only one such implementation, even when the same patent claims include the introductory phrases "one or plural" or "at least one" and the indefinite article such as "a" also applies to the case. In other words, "a" should be interpreted as "at least one" or "one or more." Similarly, the use of definite articles to introduce the scope of the patent claims cites the same. In addition, even if a specific numerical value is explicitly recited in a cited patent claim, those skilled in the art will recognize that such recitation should be read to include at least the recitation of, for example, in a case where only "two enumerations" without any other limitation, this means at least two enumerations, or two or more enumerations. Additionally, if "at least one of A, B, and C" or the like is used, those skilled in the art will appreciate that, such as "systems having at least one of A, B, and C" would include, but not limited to, systems having only A, systems having only B, systems having only C, systems having A and B, systems having A and C, systems having B and C, and/or systems having A, B and C and so on. If "at least one of A, B, or C" or the like is used, those skilled in the art will appreciate that, such as "systems having at least one of A, B, or C" would include, but not limited to, systems having only A, systems having only B, systems having only C, systems having A and B, systems having A and C, systems having B and C, and/or systems having A, B and C and so on. It will be further understood by those skilled in the art that whether or not all the abstracting words and/or phrases appearing in the description, the claims, or the drawings, appearing in connection with two or more alternative words, those are understood to be inclusive the possibility of including all the words in any one of two words or include two words. For example, the phrase "A or B" should be understood to include the possibilities of "A", "B" or "A and B".

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. The above-mentioned hardware may include one or more discrete components, an integrated circuit, an application-specific integrated circuit (ASIC), or the like.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

While the invention has been described by way of example and in terms of preferred embodiment, it should be understood that the invention is not limited thereto. Those who are skilled in the art can still make various alterations and modifications without departing from the scope and spirit of this invention. Therefore, the various embodiments disclosed herein are not to be considered as limiting, but the scope of the present invention shall be defined and protected by the following claims and their equivalents.

What is claimed is:

1. A method for adjusting an adaptive screen-refresh rate, comprising:
   determining a first screen-refresh rate set by a display source;
   setting a screen-refresh rate used by a displaying module for displaying the picture or frame on a displaying screen periodically based on the first screen-refresh rate; and
   the method further comprises determining whether a drawing module and the displaying module use the same screen-refresh rate prior to determining the first screen-refresh rate set by the display source and determining whether an adjustment mechanism of adaptive screen-refresh rate (ARR) is enabled prior to determining whether the drawing module and the displaying module use the same screen-refresh rate.

2. The method according to claim 1, wherein when determining that the drawing module and the displaying module are not using the same screen-refresh rate, the screen-refresh rate used by the drawing module is set as a system preset screen-refresh rate, wherein the system preset screen-refresh rate is different from the first screen-refresh rate.

3. The method according to claim 2, wherein a trigger signal of the screen-refresh rate used by the displaying module is different from a trigger signal of the screen-refresh rate used by the drawing module.

4. The method according to claim 3, wherein the different trigger signals are obtained by splitting a same trigger signal.

5. The method according to claim 1, wherein when determining that the drawing module and the displaying module use the same screen-refresh rate, the screen-refresh rate used by the drawing module is set as the first screen-refresh rate.

6. The method according to claim 1, further comprising:
determining whether the drawing module and the displaying module use the same screen-refresh rate when the adjustment mechanism of adaptive screen-fresh rate is enabled.

7. The method according to claim 1, wherein the step of setting the screen-refresh rate used by the displaying module based on the first screen-refresh rate further comprises: setting the screen-refresh rate used by the displaying module based on a ratio of the first screen-refresh rate.

8. The method according to claim 1, wherein the step of setting the screen-refresh rate used by the displaying module based on the first screen-refresh rate is periodically and cyclically performed.

9. A device for adjusting an adaptive screen-refresh rate, comprising:
a displaying module; and
a processing module comprising a drawing module, configured to: configure the processing module to determine a first screen-refresh rate set by a display source; and configure the processing module to set a screen-refresh rate used by the displaying module for displaying the picture or frame on a displaying screen periodically based on the first screen-refresh rate;
wherein the processing module is further configured to determine whether the drawing module and the displaying module use the same screen-refresh rate prior to determining the first screen-refresh rate set by the display source and the processing module is further configured to determine whether an adjustment mechanism of adaptive screen-refresh rate (ARR) is enabled prior to determining whether the drawing module and the displaying module use the same screen-refresh rate.

10. The device according to claim 9, when determining that the drawing module and the displaying module are not using the same screen-refresh rate, the processing module is further configured to set the screen-refresh rate used by the drawing module as a system preset screen-refresh rate, wherein the system preset screen-refresh rate is different from the first screen-refresh rate.

11. The device according to claim 10, wherein a trigger signal of the screen-refresh rate used by the displaying module is different from a trigger signal of the screen-refresh rate used by the drawing module.

12. The device according to claim 11, wherein the different trigger signals are obtained by splitting a same trigger signal.

13. The device according to claim 9, wherein when determining that the drawing module and the displaying module use the same screen-refresh rate, the processing module is further configured to set the screen-refresh rate used by the drawing module as the first screen-refresh rate.

14. The device according to claim 9, wherein the processing module is further configured to determine whether the drawing module and the displaying module use the same screen-refresh rate when the adjustment mechanism of adaptive screen-fresh rate is enabled.

15. The device according to claim 9, wherein the processing module is further configured to set the screen-refresh rate used by the displaying module based on a ratio of the first screen-refresh rate.

16. The device according to claim 9, wherein setting the screen-refresh rate used by the displaying module based on the first screen-refresh rate is periodically and cyclically performed.

* * * * *